United States Patent [19]

Neel et al.

[11] 4,166,101

[45] Aug. 28, 1979

[54] PROCESS OF THE PREPARATION OF A HYDROGEN-RICH GAS AND THE CATALYST USED IN THE PROCESS

[76] Inventors: Emmanuel E. A. Neel; Michel Deflin; Jacques Vanrenterghem; Jean-Claude Clement, all of Grand Couronne, France

[21] Appl. No.: 850,339

[22] Filed: Nov. 10, 1977

[30] Foreign Application Priority Data

Nov. 10, 1976 [FR] France ............................ 76 33900

[51] Int. Cl.² .................. C01B 1/02; B01J 23/72; B01J 23/80; B01J 23/86
[52] U.S. Cl. .................................... 423/656; 252/468; 252/473; 252/373; 423/594; 423/595; 423/596

[58] Field of Search ................ 252/62.6, 373, 468, 252/473; 423/652, 656, 594, 595, 596

[56] References Cited

U.S. PATENT DOCUMENTS

| | | | |
|---|---|---|---|
| 3,303,001 | 2/1967 | Dienes .................................... | 423/656 |
| 3,546,140 | 12/1970 | Gutmann et al. ................... | 252/473 X |
| 3,716,589 | 2/1973 | Kotanigawa et al. ............ | 252/473 X |
| 3,899,577 | 8/1975 | Sugier ................................... | 423/656 |
| 3,922,337 | 11/1975 | Campbell et al. ..................... | 423/656 |
| 4,056,490 | 11/1977 | Manning .............................. | 252/468 |

*Primary Examiner*—W. J. Shine

[57] ABSTRACT

Catalyst compositions and an improved process for converting carbon monoxide and water to hydrogen and $CO_2$ are disclosed.

16 Claims, No Drawings

PROCESS OF THE PREPARATION OF A HYDROGEN-RICH GAS AND THE CATALYST USED IN THE PROCESS

BACKGROUND OF THE INVENTION

The present invention relates to a process for the preparation of a hydrogen-rich gas by transforming a carbon monoxide-containing gas with steam according to the water-gas shift reaction:

$$CO + H_2O \rightarrow CO_2 + H_2$$

This conversion, which constitutes an important part in most of the industrial processes for the preparation of hydrogen, is generally effected in two steps in the presence of a catalyst. The first conversion step, which is performed at a temperature of over 300° C., is known as water-gas shift reaction at elevated temperature. In the second conversion step, the water-gas shift reaction at low temperature, a temperature below 300° C. is used. As most of the catalysts proposed previously for the water-gas shift reaction are only sufficiently active in a fairly limited temperature range, it is customary to use different catalysts in each of the two conversion steps.

A major drawback of most of the catalysts proposed for the water-gas shift reaction is their sensitivity to the presence of sulphur in the gas to be transformed. This applies particularly to catalysts proposed for the water-gas shift reaction at low temperature, these catalysts being poisoned in a very short period of time by the presence of sulphur in the gas. Although this drawback exists to a lesser degree with the catalysts proposed for the water-gas shift reaction at elevated temperature, nonetheless a certain number of these catalysts diminish activity considerably in the presence of sulphur in the gas to be transformed, especially where the sulphur concentration is fairly high.

The carbon monoxide-containing gas which has to be transformed in most of the industrial processes for the preparation of hydrogen by the water-gas shift reaction is generally obtained by the incomplete combustion of sulphur- and/or carbon-containing hydrocarbon oil and it therefore contains sulphur. Because of the sensitivity to sulphur of the catalyst used in the water-gas shift reaction, the sulphur must therefore be carefully eliminated from the gas mixture before the latter is subjected to the water-gas shift reaction. This sulphur elimination is generally effected in a separate operational step and it is effected at low temperature.

The necessity of effecting a desulphurization step at low temperature in the preparation of hydrogen prior to the water-gas shift reaction is extremely disadvantageous from the point of view of heat consumption. In this case the sulphur-containing gas, which is at a relatively elevated temperature, must in fact first be cooled and subsequently reheated, after the desulphurization, to the temperature required for the water-gas shift reaction at elevated temperature. As a result, there has existed an urgent need for catalysts for the water-gas shift reaction which are not modified by the presence of sulphur in the gas to be transformed, so that the sulphur-containing gases may be subjected to the reaction without prior sulphur elimination.

SUMMARY OF THE INVENTION

The invention, therefore, relates to a process for the preparation of a hydrogen-rich gas, which is carried out by transforming a carbon monoxide-containing gas with steam, characterized in that the conversion is effected in the presence of a catalyst containing a spinel whose composition corresponds to the formula $Cu_{0.5}Zn_{0.5}Fe_2O_4$ and/or a spinel corresponding to the formula $MgFe_{1.9}Cr_{0.1}O_4$.

DETAILED DESCRIPTION OF THE INVENTION

The catalysts of the invention are conveniently obtained by precipitating the metals-containing constituents in the desired proportion starting from a solution of their salts, preferably a solution of nitrates, drying the precipitate, and subsequently calcining it, preferably at a temperature from 400° to 1000° C. for a period of three to 20 hours. It has moreover been found that is possible to stabilize the above-mentioned catalysts by adding $K_2O$, $Cs_2O$ and/or CaO. Catalysts containing these constituents retain their activity longer during use, and regeneration is thus less frequent. Catalysts containing from 0.1 to 15% by weight of $K_2O$, $Cs_2O$ and/or CaO, may be used, and the content of $K_2O$, $Cs_2O$ and/or CaO of the catalysts used will preferably be from 5 to 10% by weight.

The catalysts will normally be applied in the form of particles having a length and/or a diameter of 0.2 to 0.6 mm. However, it is also possible to precipitate the catalysts on a carrier and to use them on this carrier, after drying and calcination, for the water-gas conversion reaction. Preferably, aluminum trioxide is used as carrier; the quantity of aluminum oxide will be such that it constitutes from 40 to 80% by weight of the total catalyst.

As indicated, the water-gas conversion reaction, which in principle may take place at temperatures ranging from 175° to 425° C., is generally performed in practice in several steps, for reasons of reaction rate and state of equilibrium. Preferably, the reaction is performed by passing the gas to be transformed through two or more reactors at a temperature ranging from 325° to 400° C., the reactors containing a catalyst for water-gas shift reaction at elevated temperature, and subsequently passing the mixture of partially transformed gas through a reactor at a temperature ranging from 200° to 275° C., the said reactor containing a catalyst for water-gas shift reaction at low temperature.

If the process according to the invention is applied to several steps at different temperatures, partly above and partly below 300° C., a $Cu_{0.5}Zn_{0.5}Fe_2O_4$ or $MgFe_{1.9}Cr_{0.1}O_4$ catalyst is preferred according to the invention for the water-gas shift reaction at low temperature. If desired, a catalyst outside the scope of the invention, for example, a commercial iron-chromium catalyst, may be used in this case for the water-gas conversion reaction at elevated temperature. Since the catalysts used according to the invention generally feature a sufficient activity even above 300° C., it is preferable to use a catalyst according to the invention in all the steps of the water-gas shift reaction, both above and below 300° C.

The pressure at which the water-gas shift reaction is performed may vary between wide limits. The reaction is preferably performed at a pressure in the range from 10 to 100 bars, in particular from 20 to 80 bars. The quantity of steam present in the gas mixture subjected to the water-gas shift reaction is preferably from 0.5 to 50 moles per mole of carbon monoxide.

The rate at which the gas to be transformed is passed over the catalyst may vary between wide limits, but is preferably from 1,500 to 4,500 liters of gas per hour per liter of catalyst, at normal temperature and pressure.

As has already been mentioned, the preparation of an hydrogen-rich gas according to the water-gas shift reaction forms an important part of most industrial processes from the preparation of hydrogen. The process according to the invention is very serviceable as part of such a process for the preparation of hydrogen. The carbon monoxide-containing gas is generally obtained in these processes by incomplete combustion of a hydrocarbon or a mixture of hydrocarbons with oxygen. It is preferred to add steam as a modifier to the mixture. The incomplete combustion yields a crude gas which comprises principally carbon monoxide and hydrogen. The mixture of hydrocarbons used is preferably a petroleum fraction. Petroleum fractions, both from distillation and residual, are serviceable for this purpose. Under certain conditions, coal, for example in the form of a slurry in a hydrocarbon oil, may also be used as feed. It is customary in most of the processes to withdraw heat from the crude gases leaving the combustion reactor and which are at a very elevated temperature.

This can be effected very conveniently by causing heat to be exchanged by the gases with the water in a waste heat boiler; high-pressure steam is formed and the temperature of the crude gas falls.

According to the starting material selected and the conditions used in the combustion reactor, the gas thus cooled which, however, is still at a relatively low temperature, can contain a considerable quantity of soot.

Because of the rapid clogging of the catalyst by the soot, the soot has to be removed from the gas before the latter is subjected to the water-gas catalytic shift reaction, if a conventional reactor is used. However, recently a reactor has become available which allows the catalytic transformation of gases containing solid impurities, such as soot, without the catalyst becoming rapidly clogged by the solid impurities. In this reactor, which contains hollow channels for gas in which the gas can circulate and whose walls are gas-permeable, the catalyst is present behind the walls. This reactor is based on the principle that the constituents to be transformed present in the gas spread out from the gas channels, through the walls of these channels, come into contact with the catalyst, and spread out again in the gas channels after conversion.

The reactor described above is extremely serviceable if the carbon monoxide-containing gas to be transformed in the process according to the invention contains soot. According to the soot content of the gas, some of the soot may, if desired, be separated from the gas in advance.

Upon completion of the water-gas conversion reaction, the hydrogen-rich gas must be purified again for preparation of pure hydrogen. If the crude gaseous mixture leaving the combustion reactor contained sulphur and/or soot, while no sulphur and/or soot has been removed, or only some of the soot been removed before the water-gas conversion reaction, the sulphur and/or soot must still be removed from the hydrogen-rich gas. The purification of the hydrogen-rich gas further comprises the removal of carboxylic anhydride formed and of non-transformed carbon monoxide.

The following non-limitative examples will show clearly how the invention can be carried out.

EXAMPLE I

A $Cu_{0.5} Zn_{0.5} Fe_2O_4$ catalyst is prepared by coprecipitation of the appropriate hydroxides of the metals in the desired proportion. During this process, the pH of an aqueous solution of the metal nitrates, whose concentration of metallic irons is correct, is reduced to 6.2 by adding ammonia. The mixture is separated by filtration, dried at 120° C. for 10 hours, and subsequently calcined at 500° C. for 6 hours.

By means of X-ray diffraction, it is found that the resultant mixed crystals have assumed the crystalline shape of spinel.

The calcined material is screened, and the particles of a diameter from 0.2 to 0.6 mm are used for the conversion of carbon monoxide into hydrogen with steam.

To this end, a gas having the following composition, together with steam, is passed over a bed formed by the catalyst particles:

|  | % by volume |
|---|---|
| CO | 8 |
| $CO_2$ | 20 |
| $H_2S$ | 0.8 |
| $H_2$ | 70.6 |
| $CH_4$ | 0.6 |

The following reaction conditions are used:
Temperature: 300° C.
Pressure: 30 bars (absolute value)
Space Velocity: 3,000 liters at normal temperature and pressure/1/h
Steam/gas molar ratio: 1

Eighty-nine percent of the carbon monoxide present in the gas is transformed during the process according to the following reaction:

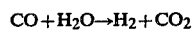

$$CO + H_2O \rightarrow H_2 + CO_2$$

EXAMPLE II

An $MgFe_{1.9} Cr_{0.1}O_4$ catalyst is prepared by coprecipitation of the relevant hydroxides of metals in the desired proportion. During this process, the pH of an aqueous solution of the nitrates of the metals, whose concentration of metallic ions is correct, is reduced to 6.2 by adding ammonia. The mixture is separated by filtration, dried at 120° C. for 10 hours, and subsequently calcined at 500° C. for 6 hours.

By means of X-ray difraction, it is found that the resultant mixture of crystals has assumed the crystalline shape of spinel.

The calcined material is screened and the particles having a diameter from 0.2 to 0.6 mm are used for the conversion of carbon monoxide with steam.

To this end, a gas having the following composition, together with steam, is passed over a bed formed by the catalyst particles:

|  | % by volume |
|---|---|
| CO | 8 |
| $CO_2$ | 20 |
| $H_2S$ | 0.8 |
| $H_2$ | 70.6 |
| $CH_4$ | 0.6 |

The following reaction conditions are used:

Temperature: 300° C.
Pressure: 30 bars (absolute value)
Space Velocity: 3,000 liters at normal temperature and pressure/1/h
Steam/gas: 1

Eighty-eight percent of the carbon monoxide present in the gas is transformed during the process according to the following reaction:

$$CO + H_2O \rightleftharpoons H_2 + CO_2$$

What is claimed is:

1. In a process for the preparation of a hydrogen-rich gas by reacting a carbon monoxide-containing gas with steam in the presence of a catalyst, the improvement wherein the catalyst comprises a spinel having the formula $Cu_{0.5} Zn_{0.5} Fe_2O_4$.

2. The process of claim 1 in which the catalyst contains from 0.1 to 15% by weight of $K_2O$, $Cs_2O$ and/or $CaO$.

3. The process of claim 1 in which the catalyst contains a carrier.

4. The process of claim 3 in which the carrier content of the catalyst is from 40 to 80% by weight.

5. The process of claim 4 in which aluminum trioxide is used as carrier.

6. The process of claim 5 in which the reaction is performed at a temperature from 175° to 425° C., a pressure of 10 to 100 bars, a space velocity of 1,500 to 4,500 liters of gas per hour per liter of catalyst at normal temperature and pressure, and in a molar ratio of steam in relation to carbon monoxide of 0.5 to 50.

7. A composition having the formula $Cu_{0.5} Zn_{0.5} Fe_2O_4$.

8. In a process for the preparation of a hydrogen-rich gas by reacting a carbon monoxide containing gas with steam in the presence of a catalyst, the improvement wherein the catalyst comprises a spinel having the formula $MgFe_{1.9} Cr_{0.1}O_4$.

9. The process of claim 8 in which the catalyst contains from 0.1 to 15% by weight of $K_2O$, $Cs_2O$ and/or $CaO$.

10. The process of claim 8 in which the catalyst contains a carrier.

11. The process of claim 10 in which the carrier content of the catalyst is from 40 to 80% by weight.

12. The process of claim 11 in which aluminum trioxide is used as a carrier.

13. The process of claim 12 in which the reaction is performed at a temperature from 175° to 425° C., a pressure of 10 to 100 bars, a space velocity of 1,500 to 4,500 liters of gas per hour per liter of catalyst at normal temperature and pressure, and in a molar ratio of steam in relation to carbon monoxide of 0.5 to 50.

14. A composition having the formula $MgFe_{1.9} Cr_{0.1}O_4$.

15. In a process for the preparation of a hydrogen-rich gas by reacting a carbon monoxide-containing gas with steam in the presence of a catalyst, the improvement wherein the catalyst comprises a mixture of a spinel having the formula $Cu_{0.5}Zn_{0.5}Fe_2O_4$ and a spinel having the formula $MgFe_{1.9}Cr_{0.1}O_4$.

16. The process of claim 15 in which the reaction is performed at a temperature from 175° to 425° C., a pressure of 10 to 100 bars, a space velocity of 1,500 to 4,500 liters of gas per hour per liter of catalyst at normal temperature and pressure, and in a molar ratio of steam in relation to carbon monoxide of 0.5 to 50.

* * * * *